United States Patent [19]

Yamada

[11] Patent Number: 4,905,095
[45] Date of Patent: Feb. 27, 1990

[54] IMAGE PROCESSING APPARATUS

[75] Inventor: Masanori Yamada, Kawasaki, Japan

[73] Assignee: Canon Kabushiki Kaisha, Tokyo, Japan

[21] Appl. No.: 372,166

[22] Filed: Jun. 27, 1989

Related U.S. Application Data

[63] Continuation of Ser. No. 889,922, Jul. 28, 1986, abandoned.

[30] Foreign Application Priority Data

Jul. 31, 1985 [JP] Japan .................................. 60-169418
Jul. 31, 1985 [JP] Japan .................................. 60-169419

[51] Int. Cl.⁴ .............................................. H04N 1/04
[52] U.S. Cl. ...................................... 358/451; 358/77; 358/446; 382/47
[58] Field of Search .......................... 358/451, 77, 446; 382/47

[56] References Cited

U.S. PATENT DOCUMENTS

| | | | |
|---|---|---|---|
| 4,496,983 | 1/1981 | Takemaka | 358/287 |
| 4,580,171 | 4/1986 | Arimoto | 358/280 |
| 4,686,590 | 8/1987 | Kato et al. | 358/287 |
| 4,701,805 | 10/1987 | Maeshima | 358/282 |

FOREIGN PATENT DOCUMENTS

| | | |
|---|---|---|
| 0105517 | 4/1984 | European Pat. Off. . |
| 2924233 | 1/1980 | Fed. Rep. of Germany . |
| 3442793 | 6/1985 | Fed. Rep. of Germany . |
| 8408535 | 12/1984 | France . |
| 60-114078 | 6/1985 | Japan . |
| 60-114081 | 6/1985 | Japan . |
| 60-114855 | 6/1985 | Japan . |
| 2063005 | 5/1981 | United Kingdom . |
| 2100093 | 12/1982 | United Kingdom . |
| 2139846A | 11/1984 | United Kingdom . |
| 2148655 | 5/1985 | United Kingdom . |
| 2149263 | 6/1985 | United Kingdom . |
| 2150394A | 6/1985 | United Kingdom . |
| 2152323 | 7/1985 | United Kingdom . |
| 2173972 | 10/1986 | United Kingdom . |
| 2176967 | 1/1987 | United Kingdom . |

Primary Examiner—Edward L. Coles, Sr.
Attorney, Agent, or Firm—Fitzpatrick, Cella, Harper & Scinto

[57] ABSTRACT

An image processing apparatus includes an image generator, a processor for trimming an image generated by the image generator and a reproducer for outputting a plurality of printouts of different images by repeating the trimming by the processor without manually entering trimming data.

66 Claims, 13 Drawing Sheets

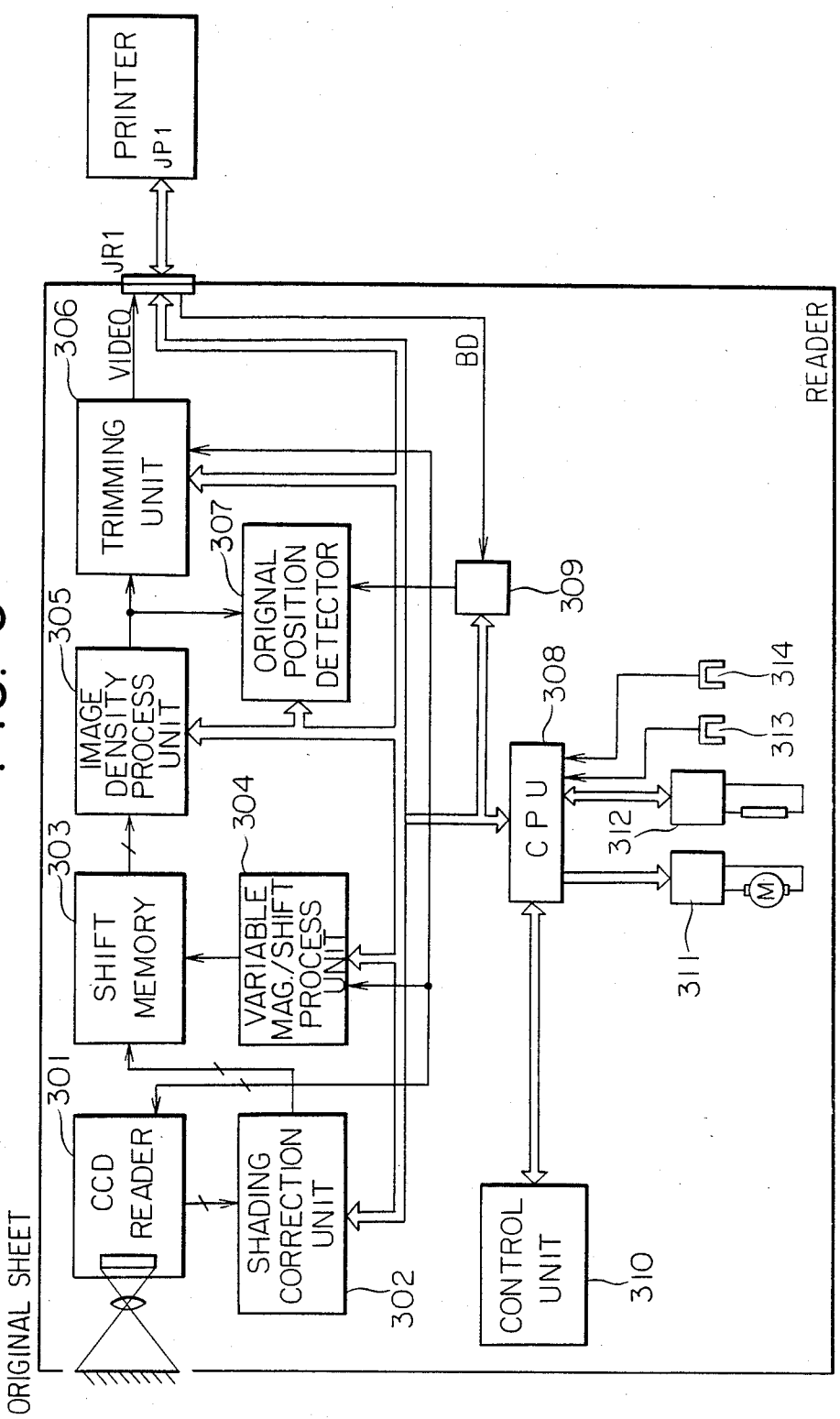

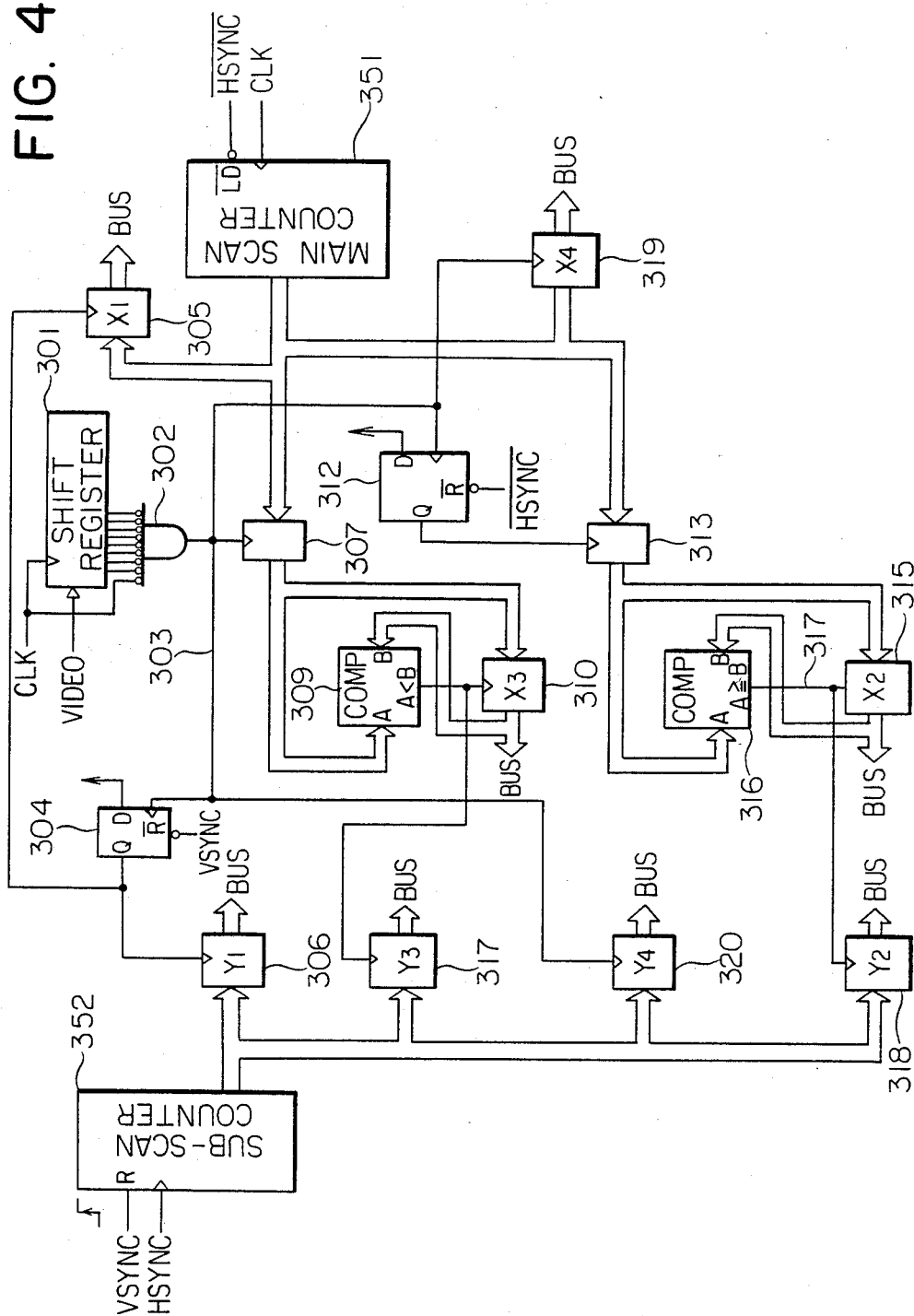

FIG. 5A

① COPY READY | SK1 | SK2 | SK3 | SK4 | SK5 | SK6 | MODE ■

② NO TRIMMING // | SK1 | SK2 | SK3 | SK4 | SK5 | SK6 | CENTERING // | ETC ■

③ TRIM ? | SK1 | MASK ? | SK2 | BOOK ? | SK3 | NONE ? | SK4 | SK5 | SK6 | BACK

④ AREA DESIGNATION ? | SK1 | SK2 | AUTO ? | SK3 | SK4 | SK5 | SK6 | BACK

⑤ TRIMMING · AUTO // | SK1 | SK2 | SK3 | SK4 | SK5 | SK6 | CENTERING // | ETC ■

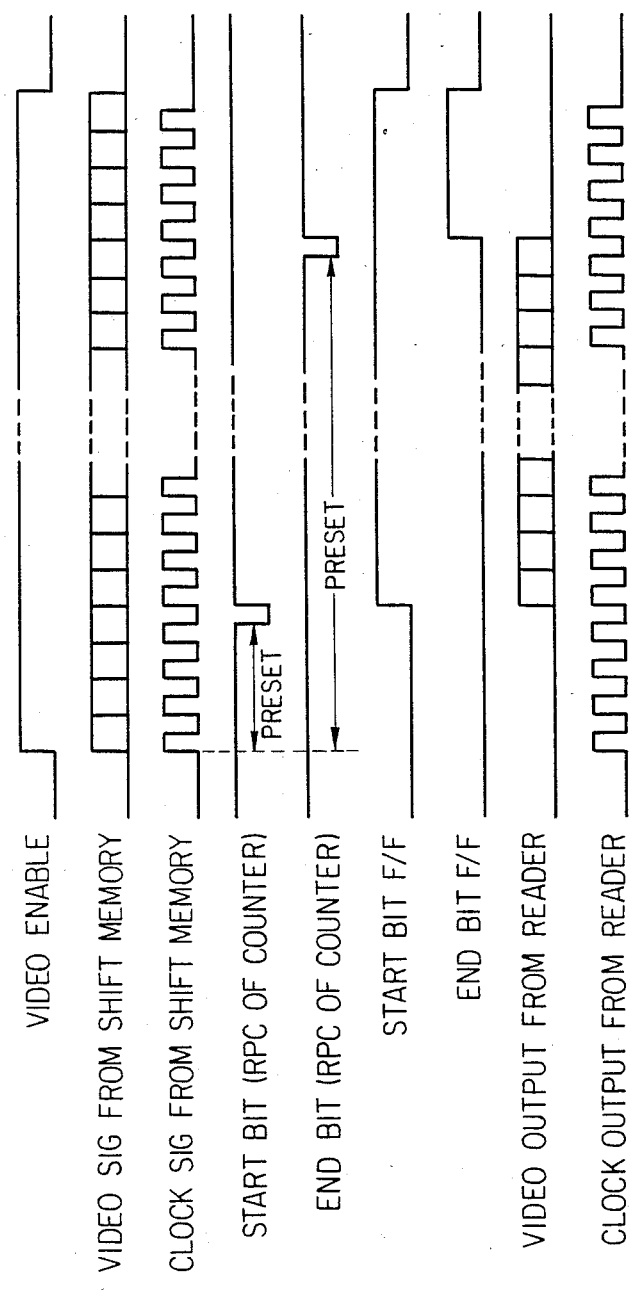

FIG. 11A
FIG. 11B
FIG. 11C
FIG. 11D

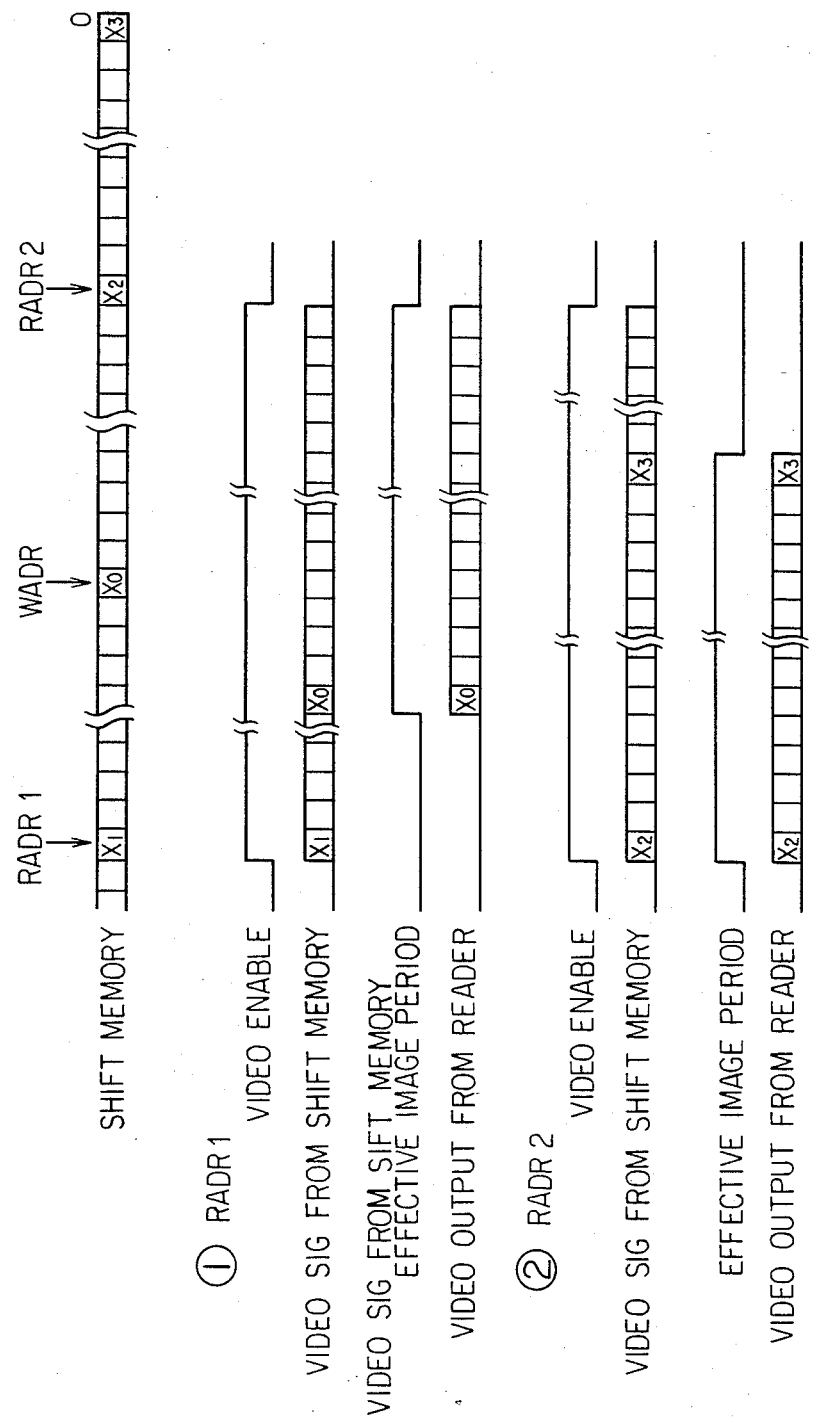

IMAGE PROCESSING APPARATUS

This application is a continuation of application Ser. No. 889,922 filed July 28, 1986, now abandoned.

BACKGROUND OF THE INVENTION

1. Field of the Invention

The present invention relates to an image processing apparatus such as a copying machine, and more particularly to an image processing apparatus having an editing function.

2. Related Background Art

In prior art copying machine, the size of sheet usable in the copying machine is limited (usually up to size A3). Thus, in an enlarge copy mode, only a portion of a document (original) image may be outputted. In order to form a copy sheet larger than the maximum allowable sheet size by patching a plurality of copy sheets, it is necessary for an operator to change the orientation and position of the document sheet for each copy. In addition, margins of the copy sheets and the output order of the copy sheets are variable and efforts are required to patch those copy sheets.

SUMMARY OF THE INVENTION

It is an object of the present invention to provide an image processing apparatus which eliminates the above short comings.

It is another object of the present invention to provide an image printer which can print an image of a larger size than a sheet size without requiring the intervention of an operator.

It is another object of the present invention to provide an image processing apparatus which outputs an original image in a plurality of divided forms.

It is another object of the present invention to provide an image processing apparatus which reproduces an image by repeating an image trimming process.

It is another object of the present invention to provide an image processing apparatus which repeatedly reproduces an image in accordance with a document sheet size and a copy sheet size.

It is another object of the present invention to provide an image processing apparatus which repeatedly reproduces an image in accordance with a given document sheet size and a given magnification.

The above and other objects of the present invention will be apparent from the following description of the embodiments.

BRIEF DESCRIPTION OF THE DRAWINGS

FIG. 3 shows a reader system block diagram, FIG. 4 shows a block diagram of a document coordinate detection circuit, FIGS. 5A and 5B respectively show a copy mode setting flow chart and execution flow chart, FIG. 10 shows a timing chart for trimming, FIGS. 11A to 11D illustrate a principle of magnification, FIGS. 12A and 12B illustrate a principle of movement.

DESCRIPTION OF THE PREFERRED EMBODIMENTS

Figure 1A:
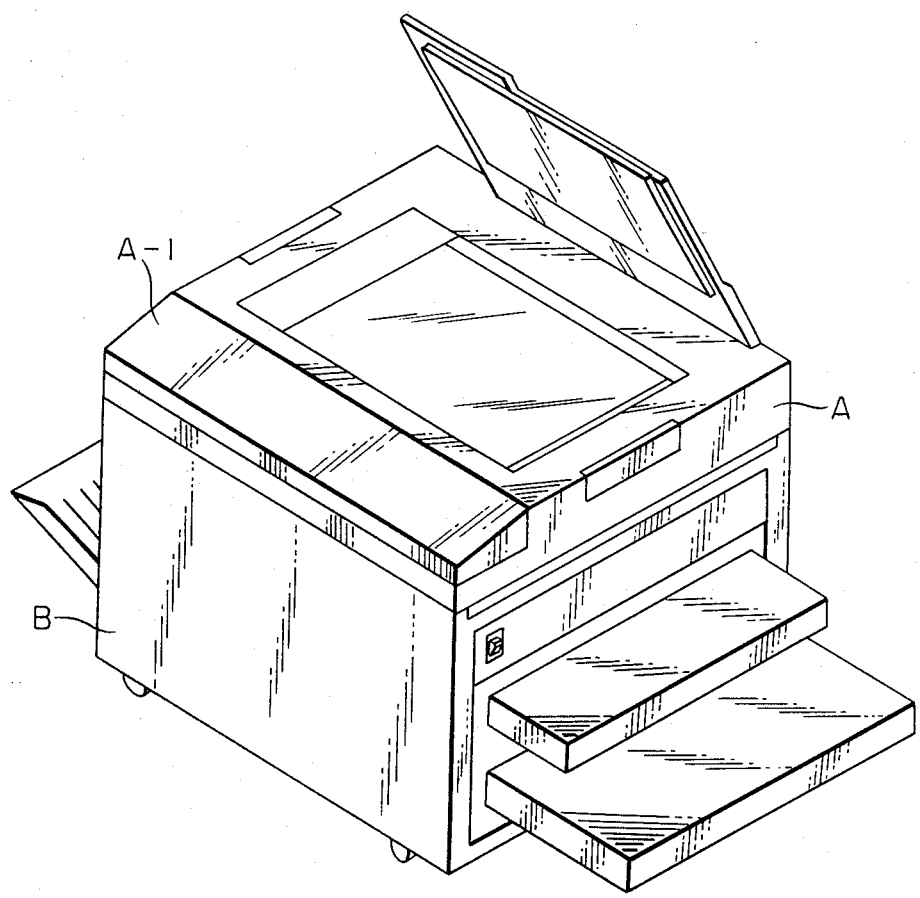
FIGS. 1A and 1B show an outer view and a sectional view of a reader/printer, respectively.
Figure 1B:
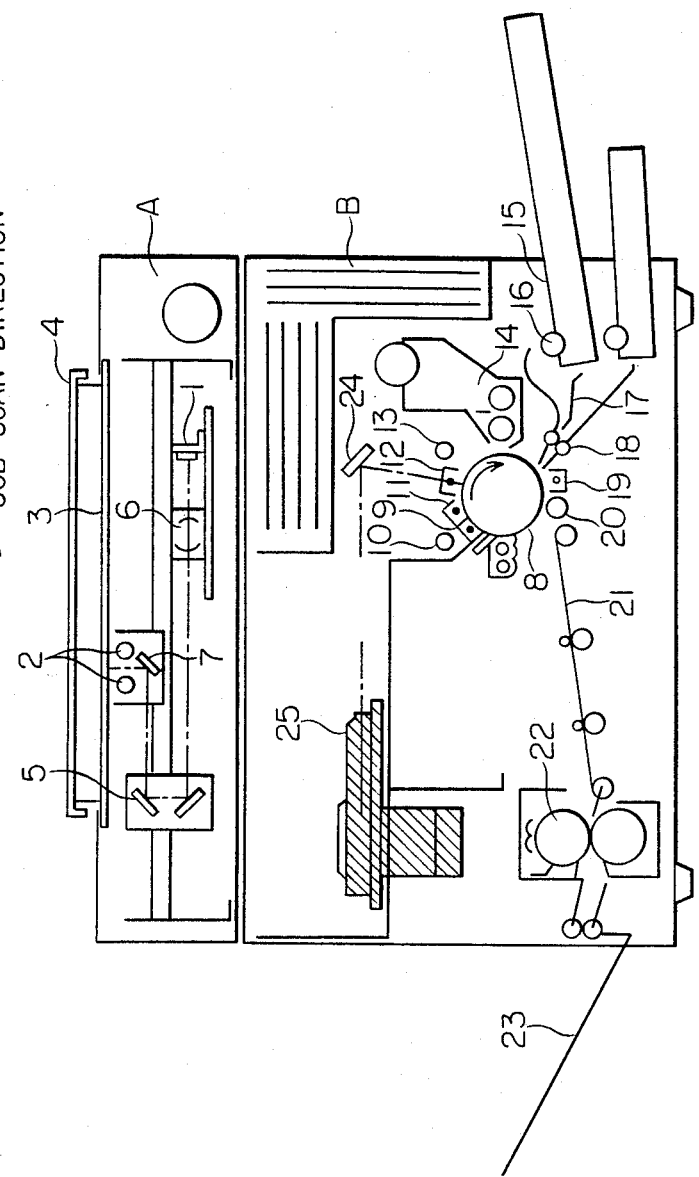

FIG. 1A shows an outer view of a copying machine of the present invention. The present copying machine comprises two units, a reader A and a printer B. The reader A has a console unit A-1. FIG. 1B shows a sectional view of the reader A and the printer B. A document sheet is placed on a document sheet table glass 3 in a face-down, state and urged to the glass by a document sheet cover 4. The document sheet is illuminated by a fluorescent lamp 2 and light reflected therefrom is focused onto a CCD 1 through mirrors 5 and 7 and a lens 6. The mirrors 7 and 5 are moved at relative speed of 2 to 1. The optical system is moved at a constant velocity through a PLL by a DC servo motor. In a unity magnification (or equal size) mode, it is moved at 180 mm/sec in a forward run (left to right), and at 800 mm/sec in a backward run (right to left) without regard to the magnification; a maximum document size that can be processed is size A3 and the resolution is 400 dots/inch, Thus, 4678 (=297/25.4×400) bits are required for the CCD and a 500-bit CCD is used in the present embodiment. The main scan period is 352.7 $\mu$sec (=$10^6$/180×25.4/400).

An image signal which was bit-serialized in the reader A is supplied to a laser scan optical system unit 25 of the printer B. The unit comprises a semiconductor laser, a collimater lens, a rotating polygon mirror, an F-$\theta$ lens and a correction optical system.

The image signal from the reader is supplied to the laser by which it is electro-optically converted, and the resulting light beam is directed to the polygon mirror which is rotating at a high speed through the collimater lens, and the light reflected therefrom is directed to a photoconductor 8. Arranged on the photoconductor 8 are process components to allow image formation, that is, a predischarger 9, a predischarging lamp 10, a primary charger 11, a secondary charger 12, a flat exposure lamp 13, a developing unit 14, a paper cassette 15, a paper feed roller 16, a paper guide 17, a registration roller 18, a transfer charger 19, a separation roller 20, a convery guide 21, a fixing unit 22, and a tray 23. When the paper cassette 15 is loaded, a sheet size signal is generated. The velocity of the photo conductor 8 and the paper feed is 180 mm/sec. The printer B is a so-called laser beam printer and the explanation of a principle operation thereof is omitted here.

The copying machine of the present embodiment has intelligence and can perform image editing. It can provide: magnification from 0.35 to 4.0 times at a pitch of 1%, trimming to extract image of specified area, movement to move the trimmed image to any point on the sheet and detection of coordinate of the document sheet mounted on the document sheet table. Details of those functions will be described later.

Figure 2:
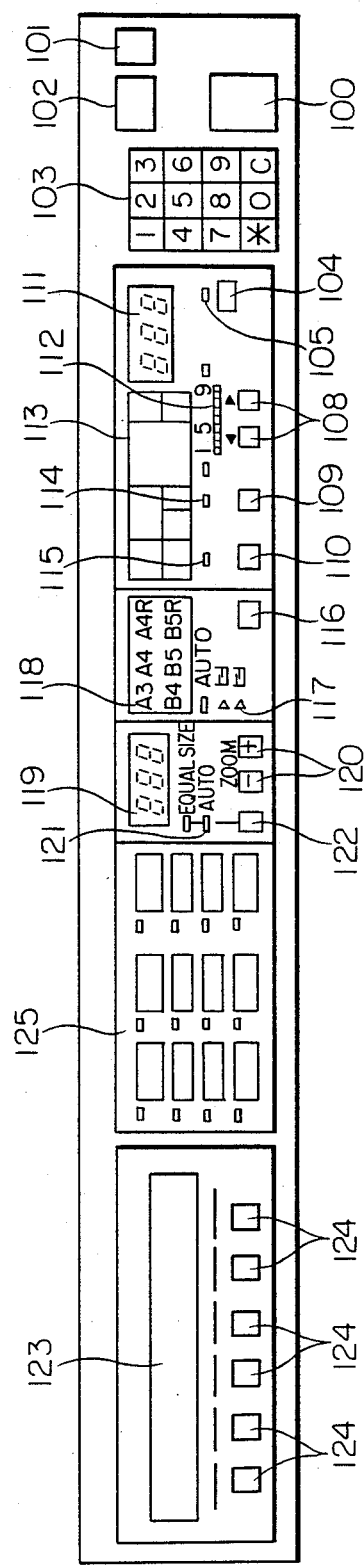
FIG. 2 shows a detail of a console unit.

FIG. 2 shows a detail of the console unit. Numeral 100 denotes a copy start key, numeral 102 denotes a copy stop key, numeral 101 denotes a key to restore a copy mode to a standard mode, numeral 103 denotes keys comprising ten-key 0~9, a C-key for clearing a count and a *-key used to enter numeric data of a trimming area, numeral 108 denotes keys for increasing and decreasing density, numeral 112 denotes an indicator to indicate the density, numerals 104 and 105 denote a key to turn on and off a document sheet coordinate detection function and an indicator therefor, numeral 111 denotes a copy count display, numeral 113 denotes an error message display, numerals 109 and 114 denote a key to turn on and off an automatic density control function and an indicator therefor, numerals 110 and 115 denote a key to turn on and off a dither function for a photograph document and an indicator therefor, numeral 116 denotes a key to select the paper cassette, numeral 117 denotes an indicator to indicate the selected paper cassette, numeral 118 denotes an indicator to indicate the sheet size, numeral 120 denotes a key to increase or decrease the magnification at a pitch of 1%, numeral 119 denotes a magnification indicator, numeral 122 denotes a key to select an auto-magnification mode or a unity magnification (or equal size) mode, numeral 121 denotes an indicator to indicate the selected mode, numeral 125 denotes a preset key indicator for presetting a copy mode, numeral 123 denotes a liquid crystal display having 32 5×7-dot matrices and numeral 124 denotes soft keys for selecting a desired mode from the copy modes displayed on the display 123.

FIG. 3 shows a system block diagram of the reader.

A CCD reader 301 has a CCD, a CCD clock driver, an amplifier for a signal from the CCD and an A/D converter.

The CCD reader 301 produces a 6-bit digital image data which is supplied to a shading correction unit 302.

Figure 9:
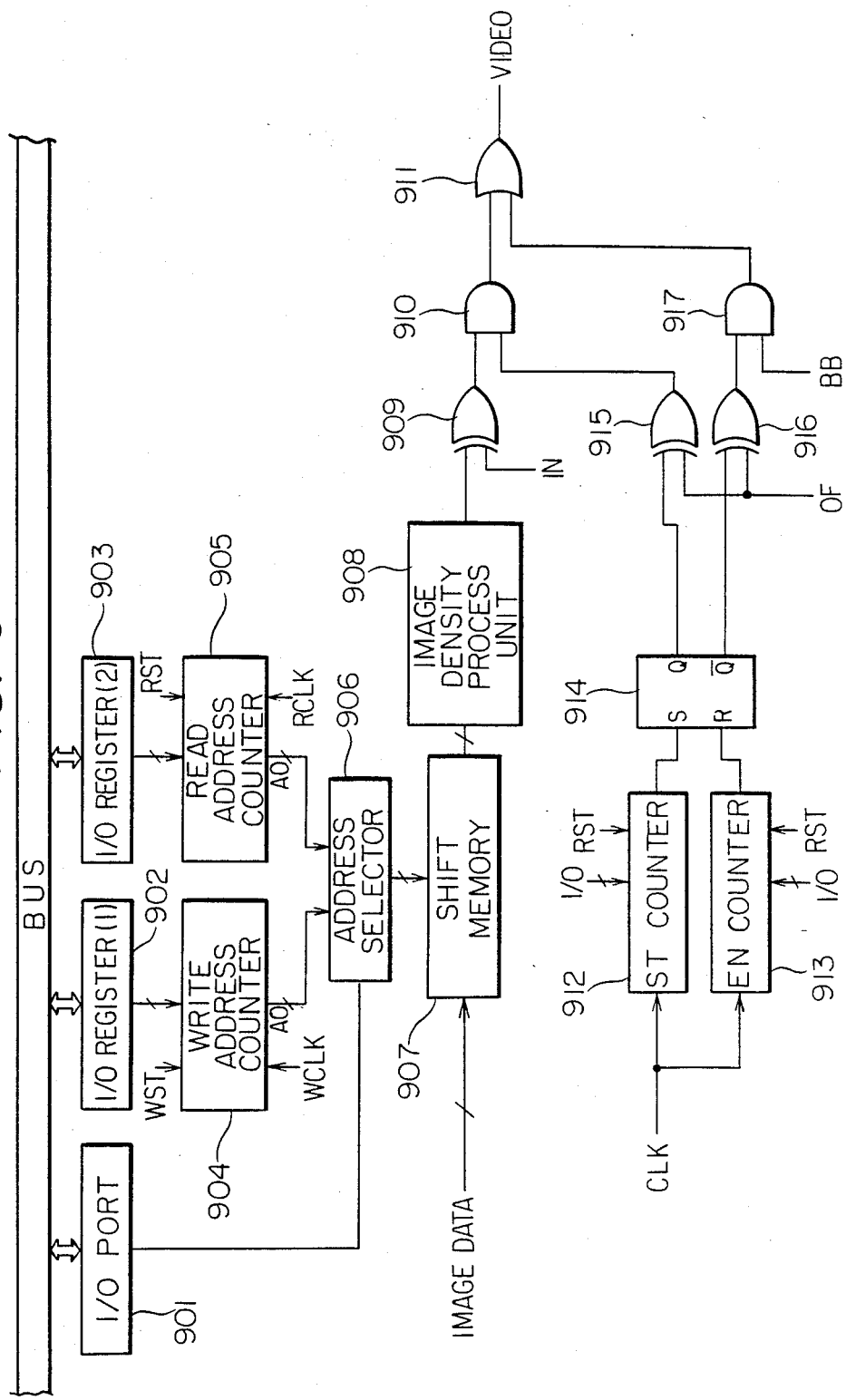
FIG. 9 shows a block diagram of edit/move/magnify functions.

The shading correction unit 302 detects and corrects shading of the light source and the lens. The image signal is then temporarily stored in a shift memory unit 303 which has two lines of shift memories. When N-th line of image data is written into the first memory, the (N−1)th line of image data is read from the second memory. The shift memory unit further has a write address counter for writing the image data into the shift memory, a read address counter for reading the image data and an address selector for selecting the address signal supplied from those two counters. A detail thereof is shown in FIG. 9.

A magnify/move process unit 304 changes magnification in a main scan direction or moves the image by varying a clock to write the image signal into the shift memory, a clock to read the image signal from the shift memory and a read timing. A detail thereof will be explained later.

The image signal outputted from the shift memory is supplied to a density process unit 305 where it is binarized or dither-processed and it is supplied to a trimming unit 306. The trimming unit 306 forcibly changes any section of the main scan line image data to "0" or "1" to allow editing of the image. A detail thereof will be described later.

The binary signal outputted from the density process unit 305 is also supplied to a document sheet position detector 307 which detects a coordinate of the document sheet on the document sheet table glass by using the binary signal.

A CPU 308 comprises CPU, ROM, RAM timer and I/O interface, The CPU 308 controls a console unit 310, controls the reader in accordance with operator setting and controls the printer by a serial communication.

Numeral 311 denotes a DC servo motor driver. The CPU presets a velocity data corresponding to a magnification. Numeral 312 denotes a fluorescent lamp driver which turns on and off the fluorescent lamp and controls the intensity thereof. Numerals 313 and 314 denote position sensors by which the CPU detects the position of the optical system. The reader is connected to the printer through connectors JR1 and JP1. Control signals necessary for image data communication and serial communication are exchanged between the reader and the printer. A detail thereof will be explained later with reference to FIGS. 13 and 14. The reader receives a horizontal synchronization signal BD from the printer through the connector JR1 and it is supplied to a clock generator 309, which generates a transfer clock for the CCD signal and a read/write clock for the shift memory in synchronizm with BD.

FIG. 4 shows a circuit for detecting the coordinate. A main scan counter 351 is a count-down counter which represents a scan position in one main scan line. The counter is set to a maximum count in the main scan direction (X-direction) by a horizontal synchronization signal HSYNC and decremented each time an image data clock CLK is applied thereto. A subscan counter 352 is a count-up counter which is reset to "0" at a rise of VSYNC (image leading edge signal) and incremented by the HSYNC signal to represent the SCAN position in the sub-scan direction.

The binarized video data VIDEO is supplied to a shift register 301 eight bits parallel. When the 8-bit input is received, a gate circuit 302 checks if all bits of the 8-bit data are white, and if YES, "1" is sent to a signal line 303. When the first white 8-bit data appears after the start of scan of the document sheet, a flip-flop (F/F) 304 is set. The F/F has been reset by the VSYNC. It is kept set until the next VSYNC is received. When the F/F 304 is set, the content of the main scan counter 351 is loaded to a latch (F/F) 305. This is a coordinate $X_1$. The content of a sub-scan counter 352 is loaded to a latch 306. This is a coordinate $Y_1$. Thus, $P_1(X_1, Y_1)$ is determined.

Each time "1" is sent to the signal line 303, the content of the main scan counter 351 is loaded to a latch 307. When the content of the main scan counter at the first apperance of white 8-bit data is loaded to the latch 307, it is compared with the data in the latch 310 (which has been set to the maximum count in the X-direction at the time of VSYNC) by a comparator 309. If the data in the latch 307 is smaller, the data in the latch 307 is loaded to the latch 310. The content of the sub-scan counter is loaded to the latch 311 The operation is carried out before the next 8-bit data is supplied to the shift register 301. The comparison of the data of the latch 307 and the latch 310 is carried out over the entire image area so that a minimum value in the X-direction of the document area remains in the latch 310 and the corresponding Y coordinate remains in the latch 311. Since the main scan counter 351 is the count-down counter, the coordinate corresponding to the minimum value in the X-direction represents a coordinate which is farthest from SP in the main scan direction. This is $P_3(X_3, Y_3)$.

An F/F 312 is set when the first white 8-bit data appears for each main scan line. It is reset by the horizontal synchronization signal HSYNC, set by the first white 8-bit data and kept set until the next HSYNC. When the F/F 312 is set, the content of the main scan counter corresponding to the position of the first white signal in the line is loaded in the latch 313. The content of the latch 313 is compared with a content of a latch 315 by a comparator 316. The latch 315 has been set to a minimum value "0" in the X direction of the time of VSYNC.

If the data in the latch 315 is smaller than or equal to the data in the latch 313, the signal 317 is activated and the data in the latch 313 is loaded to the latch 315. This operation is carried out between the HSYNC and the next HSYNC.

The above comparision is carried out over the entier image area so that the maximum value in the X direction of the document coordinate, that is, the X coordinate of the white signal closest to the scan start point in the main scan direction remains in the latch 315. This is $X_2$. When a signal is sent to a signal line 317, the value from the sub-scan is loaded to a latch 318. This is $Y_2$. Thus, $P_2$ ($X_2$, $Y_2$) is determined.

Each time the white 8-bit data appears in the entire image area, the count of the main scan counter and the count of the sub-scan counter are loaded to the latches 319 and 320, respectively. Thus, at the end of the prescan of the document sheet, the count at the last appearance of the white 8-bit data remains in the counter. This is $P_4$ ($X_4$, $Y_4$).

The data lines of those eight latches 306, 311, 320, 318, 305, 310, 315 and 319 are connected to a bus line BUS of the CPU of FIG. 2, and the CPU reads in those data at the end of the prescan.

FIG. 9 shows a circuit of the shift memory. A write address counter 904 is an address counter for writing data into a shift memory 907, and a read address counter 905 is an address counter for reading data from the shift memory 907. An address selector 906 receives an instruction from the CPU through an I/O port 901 to select one of an address signal of the write address counter 904 and an address signal of the read address counter 905 to address the shift memory.

I/O registers 902 and 903 are registers by which the CPU applies preset values to the write address counter 904 and the read address counter 905.

The write address counter 904 and the read address counter 905 are count-down counters to which WST signal and RST signal to instruct the start of count operation are supplied, and a write clock WCLK to the shift memory and a read clock RCLK from the shift memory are supplied.

Numerals 915 and 916 denote exclusive OR gates for defining the image area, and OF denotes a control signal thereto. When the OF signal is "1", a frame determined by an ST counters 912 and an EN counter 913 is masked and the area outside the frame is outputted, and when the OF signal is "0", the image in the frame is outputted and the image outside the frame is masked.

Numeral 910 denotes an AND gate for controlling the image data which was outputted from the shift memory and binarized by a density process unit 908, numeral 917 denotes an AND gate for determining whether the masked area is to be outputted white or black, and BB is a control signal therefor. When the BB signal is "1", a block image is outputted, and when it is "0", a white image is outputted.

Numeral 911 denotes an OR gate which outputs the image output from the gates 910 or 917 as VIDEO, numeral 909 denotes an exclusive OR gate for controlling whiteblack reversal of the image data and IN is a control signal therefor. When the IN signal is "1", the image is outputted as it is, and when it is "0", the image is reversed. The CPU outputs the signals in the modes designated by the operator.

The ST counter 912 and the EN counter 913 are start bit counter and end bit counter for outputting the image only in designated area. The CPU presets the count data for gating, through the I/O. A flip-flop 914 is set by the count-up of the ST counter 912 and reset by the count-up of the EN counter 913. FIG. 10 shows an operation thereof.

When the OF signal is "1", as Q of the F/F 914 becomes "1" in response to the count-up of the ST counter 912, the output of the gate 915 becomes "0" and the gate 910 produces no output until the EN counter 913 is counted up. Since the output of the gate 916 is "1", the gate 917 is "1" and the gate 911 is "1" if the BB signal is "1". Thus, it is a black mask.

Conversely, when OF is "1" and "BB" is "0", it is white masked. When OF is "0", the outputs of the gates 915 and 916 are "1" and "0". Thus, if BB is "1", the area outside the trimmed area is black, and if OT is "0" and BB is "0", the area outside the trimmed area is white.

A principle of variable magnification is now explained. The magnification in the sub-scan direction is changed by varying a scan speed of the optical system. The CPU calculates the speed of the DC servo motor based on a magnification specified by the operator, calculates a PLL frequency for that speed, and presets it to the motor driver 311 of FIG. 3 prior to the scan. Since the paper feed velocity of the printer is constant at 180 mm/sec, when the magnification factor is two, the speed of the optical system is one half of the normal speed of 180 mm/sec, that is, 90 mm/sec, and when the magnification factor is ½, the speed is two times, that is, 360 mm/sec.

The variable magnification in the main scan direction is illustrated in FIG. 11. The A/D converted serial signal supplied from the CCD at the constant frequency is sampled at a clock rate corresponding to the magnification.

In the unity magnification mode, it is written into the shift memory by a write clock WCLK which is of equal frequency to the transfer clock CLK from the CCD as shown in FIG. 11A, and is read out from the shift memory by the read clock RCLK of the equal frequency to the output clock VCLK to the printer as shown in FIG. 11B.

In a ½ reduction mode, the write clock WCLK to the shift memory is of one half frequency of that of the transfer clock CLK as shown in FIG. 11C to sample one-out-of-two bits of the original information, and the data is read by the read clock RCLK of the equal frequency to the output clock VCLK as shown in FIG. 11A.

In a two-times magnification mode, the writing into the shift memory is done in the same manner as the unity magnification mode as shown in FIG. 11A, and the reading from the shift memory is done at one-half clock rate of the output clock VCLK to the printer as shown in FIG. 11D so that one bit is added for each bit of the original information and the two-times magnification is attained.

A principle of movement of image is explained with reference to FIGS. 12A and 12B.

Figure 12A:
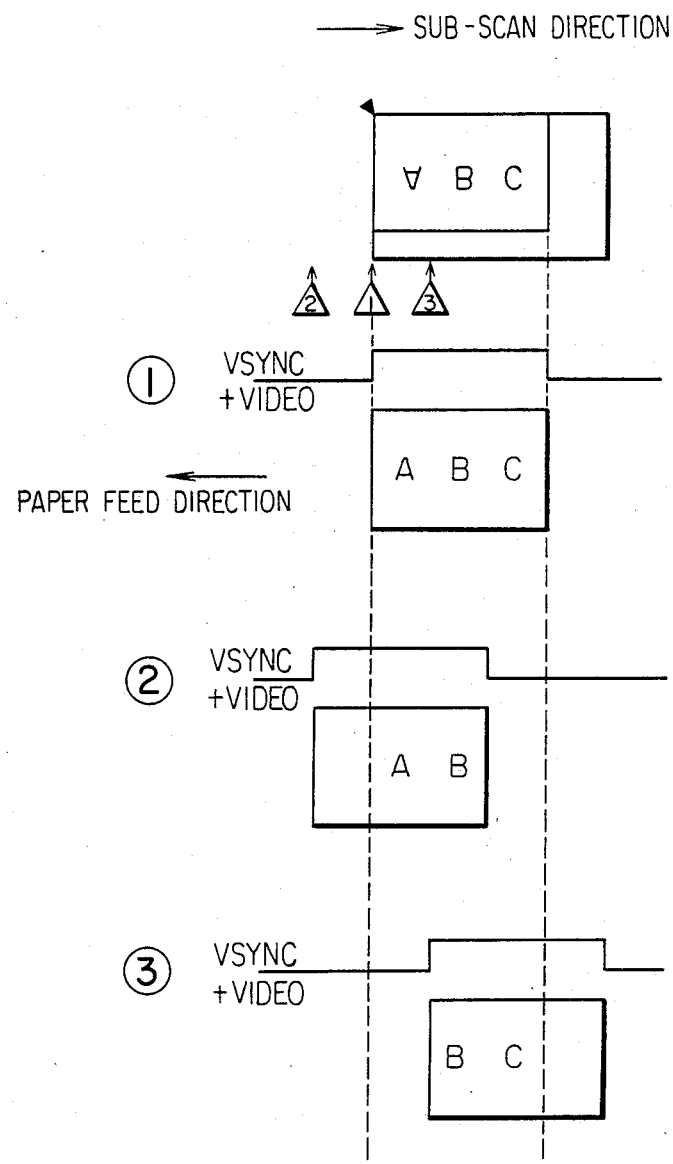

The movement in the sub-scan direction is attained by changing the timing of the document image scan and the VSYNC output to the printer as shown in FIG. 12A.

If the VSYNC as well as the VIDEO are outputted when the optical system reaches a position △ relative to the document, a non-moved output ① is produced.

If the VSYNC as well as the VIDEO are outputted when the optical system reaches a position ②, a backwardly moved output ② is produced. If the VSYNC as well as the VIDEO are outputted when the optical system reaches a position ③, a forwardly moved output ③ is produced.

The movement in the main scan direction is attained by relatively changing the down-count start address supplied to the write address counter 904 and the read address counter 905 through the I/O registers 902 and 903 of FIG. 9, as shown in FIG. 12B.

Assuming that the write start address to the shift memory is WADR and the read start address is RADR1, an image data $X_0$ corresponding to the address WADR for the output main scan width VIDEO ENABLE is shifted right as shown by ① . If the read start address is RADR 2, a data $X_3$ corresponding to the shift memory address 0 is shifted left relative to the VIDEO ENABLE. An effective image period signal in FIG. 12B is a trimming period signal generated by the ST counter 912, EN counter 913, F/F 914, and gates 915, 916, 917, 910 and 911. In the shift memory of FIG. 12B, an invalid image beyond the address 0 to WADR is necessary for a white signal.

Figure 13:
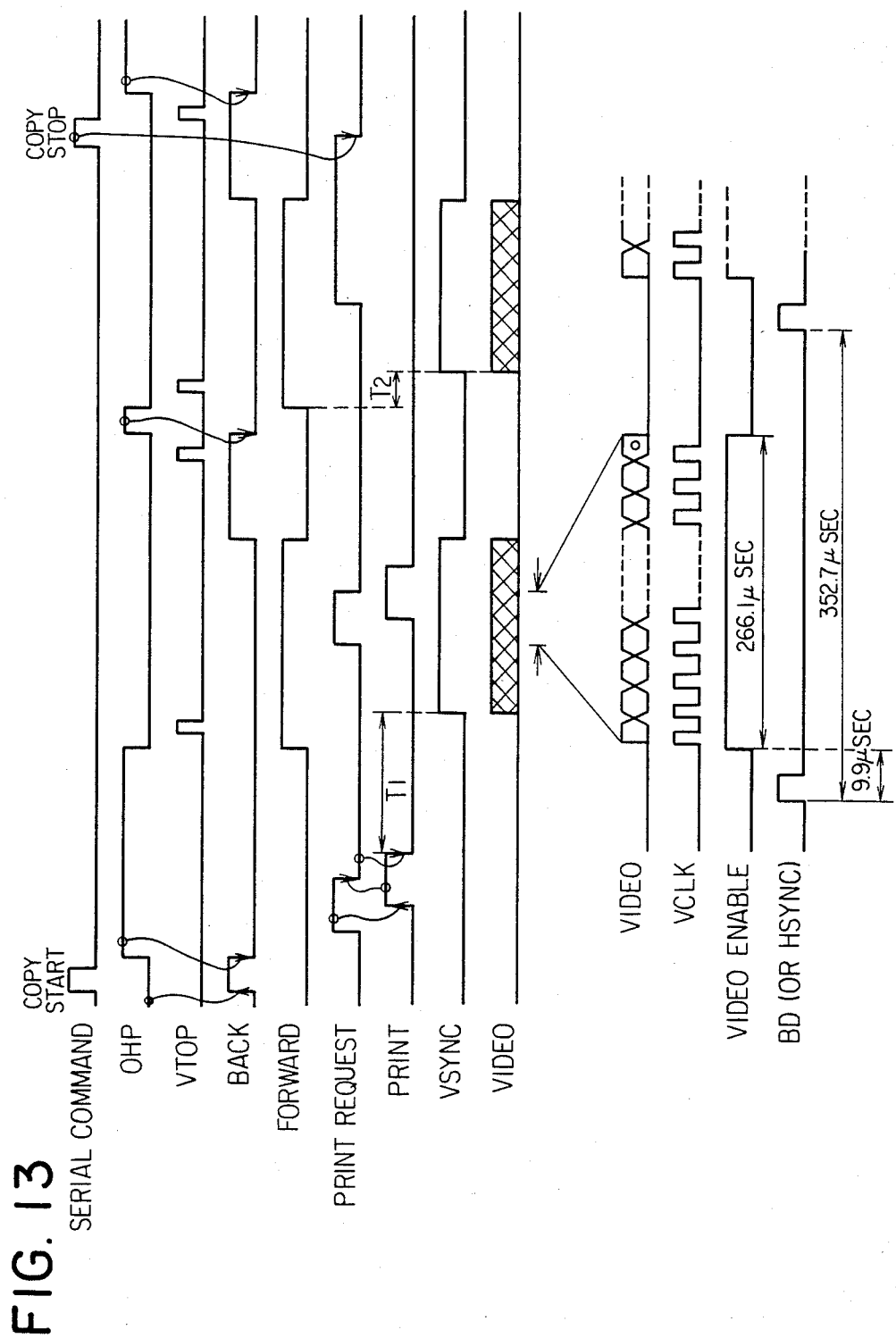
FIGS. 13 and 14 show interface timing charts.

An interface signal timing is explained with reference to FIGS. 13 and 14.

The BEAM-DETECT signal BD is used to synchronize with the rotation of the polygon scanner of the printer when the reader is connected to the printer, and corresponds to the leading edge signal of the main scan line. The signal BD is produced by detecting to beam by a photosensor arranged closely to the drum on an extended line of the laser scan. The image signal VIDEO is outputted 4678 per line with a width of about 56 ns per pixel. The VIDEO is produced in synchronism with the BD when it is connected to the printer and produced in synchronism with the internal quasi-horizontal synchronization signal (HSYNC) in the transmission to other unit. The VIDEO ENABLE in the period signal during with the 4678 image data are outputted, and produced in synchronism with the BD or HSYNC. The VSYNC indicates the period of the image in the sub-scan direction, and the PRINT REQUEST signal indicates a paper feed ready status in the printer. The reader sends a paper feed command by the PRINT signal in response to the PRINT REQUEST signal, and sends the VSYNC and VIDEO afer a time period T1 which is determined by the magnification for the copy mode selected by the operator, the trimming area and the distance of movement. The OHP and VTOP are input signals from the sensors 313 and 314 of FIG. 3 for indicating the position of the optical system of the reader. Numeral 313 indicates a rest position of the optical system and numeral 314 indicates a leading edge of the document sheet. The BACK and FORWARD are signals for controlling backward and forward movements, applied from the CPU 308 of FIG. 3 to the optical system motor driver 311.

Figure 14:
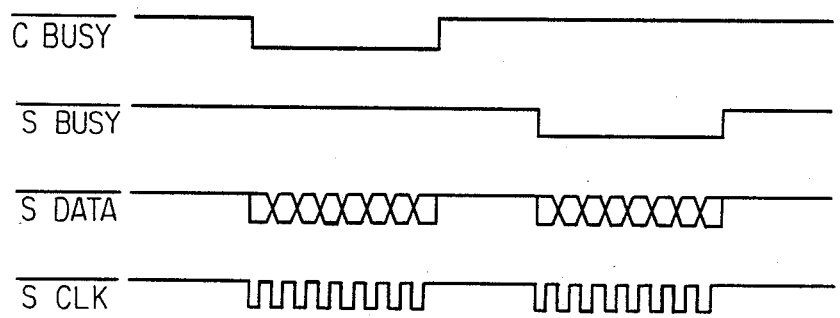

In FIG. 14, S.DATA, S.CLK, CBUSY and SBUSY denote signal lines for communication between the reader and the printers. S.DATA and S.CLK denote 8-bit serial data and clock, which are bidirectional lines. CBUSY is produced when the reader outputs the data and the clock, and SBUSY is outputted when the printer outputs the data and the clock. Examples of the communication are copy start and copy stop commands from the reader to the printer as shown in a timing chart of FIG. 13.

Figure 6A:
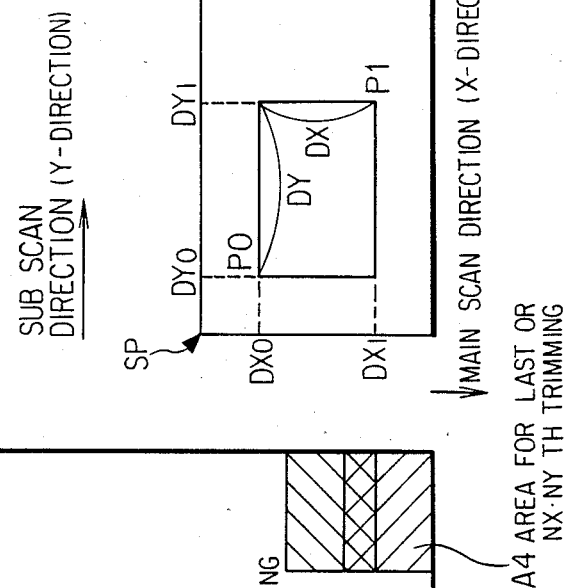
FIGS. 6A, 6B, 7 and 8A to 8C illustrate various functions performed by the present invention.
Figure 7:
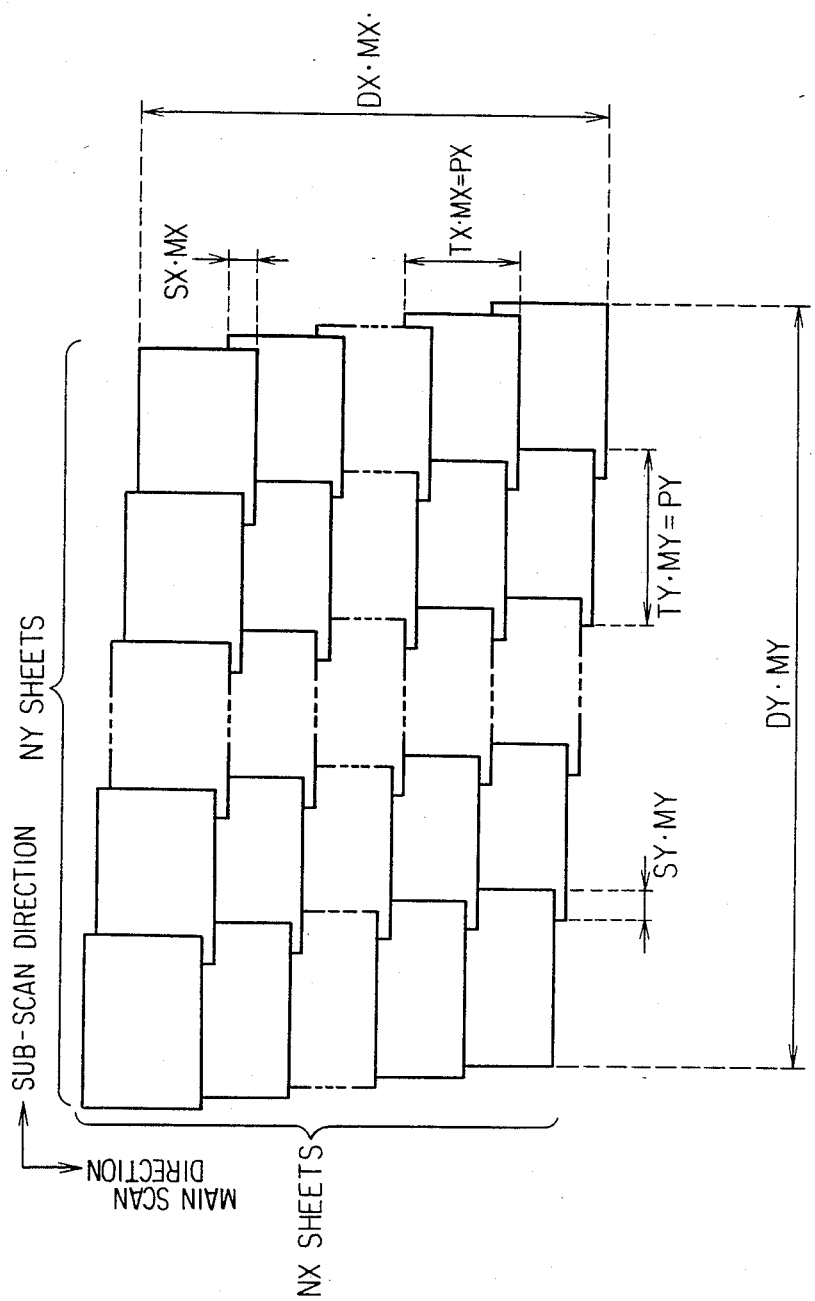
Figure 8A:
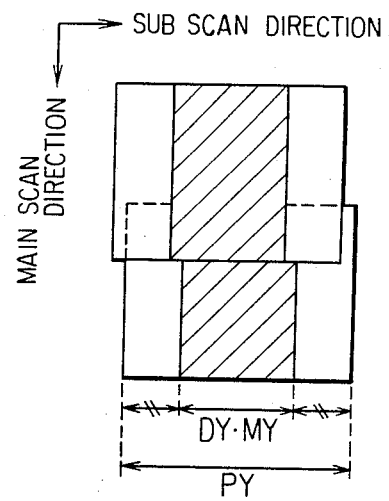
Figure 8B:
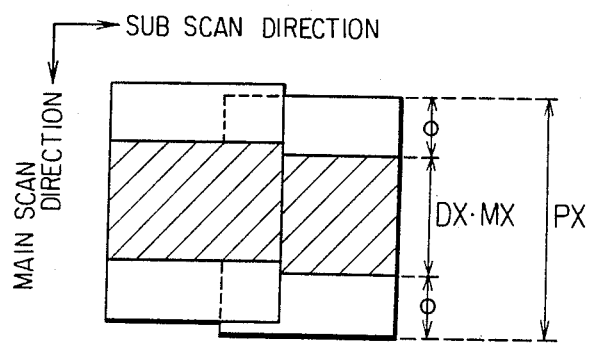
Figure 8C:
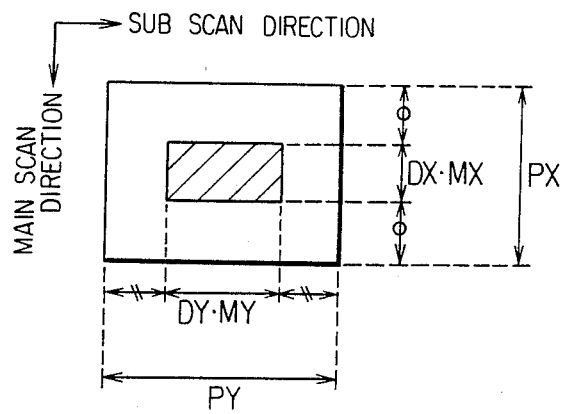

An editing function auto-timing mode is explained with reference to FIGS. 6 to 8. In this mode, if sizes DX.MX and DY.MY which are products of document sheet sizes DX and DY multiplied by magnifications MX and MY inputted from the console unit are larger than copy sheet sizes PX and PY, the document sheet is automatically divided so that a copy of the output size of DX.MX and DY.MY is produced by a plurality of copy sheets (NX sheets in the main scan direction, NY sheets in the sub-scan direction, and NX.NY sheets in total), and shown in FIG. 7. If DX.MX>PX and DY.MY>PY, the output copy is as shown in FIG. 7, and if DX.MX>PX and DY.MY≦PY, only one copy sheet is needed in the sub-scan direction as shown in FIG. 8A and the center automatically moves in the sub-scan direction. If DX.MX≦PX and DY.MY>PY, the center automatically moves to one copy sheet in the main scan direction as shown in FIG. 8B. M DX.MX≦PX and DY.MY≦PY, only one copy sheet is needed in both main scan direction and sub-scan direction, that is, only one copy sheet in total as shown in FIG. 8C and the center automatically moves in both scan directions. The document sheet size may be detected by a photosensor which directly senses the document sheet, and the copy sheet size may be detected by detecting the cassette size or by directly entering it by keys. The magnification is entered by the console unit of FIG. 2.

FIG. 5A shows a flow chart of the editing function auto-trimming in accordance with the present invention. In no error condition is present, the display 123 of the console unit A1 of FIG. 2 displays as shown in ① . When a soft key SK6 is depressed, it displays as shown in ② . In ② , it shows that the trimming has not been set as the editing function and the center movement has been set as the move function. In ② , when SK6 corresponding to ETC is depressed the current set mode of other function is displayed. In ② , if SK4 or SK5 is depressed other move function can be set. In ② , if SK1 or SK2 depressed, the display is as shown ③ which shows that the edit functions include trimming, masking, book and cancel. "None" indicates that nothing is currently selected. If SK1 is depressed, the trimming mode is set and the display is as shown in ④ , and one of the auto-division mode of the document sheet, that is, auto-trimming mode and a mode in which the operator can designate any trimming area is selected. In ④ , if SK3 is depressed the auto-trimming is selected and the display is as shown in ⑤ . Thus, the setting is completed.

Figure 5B:
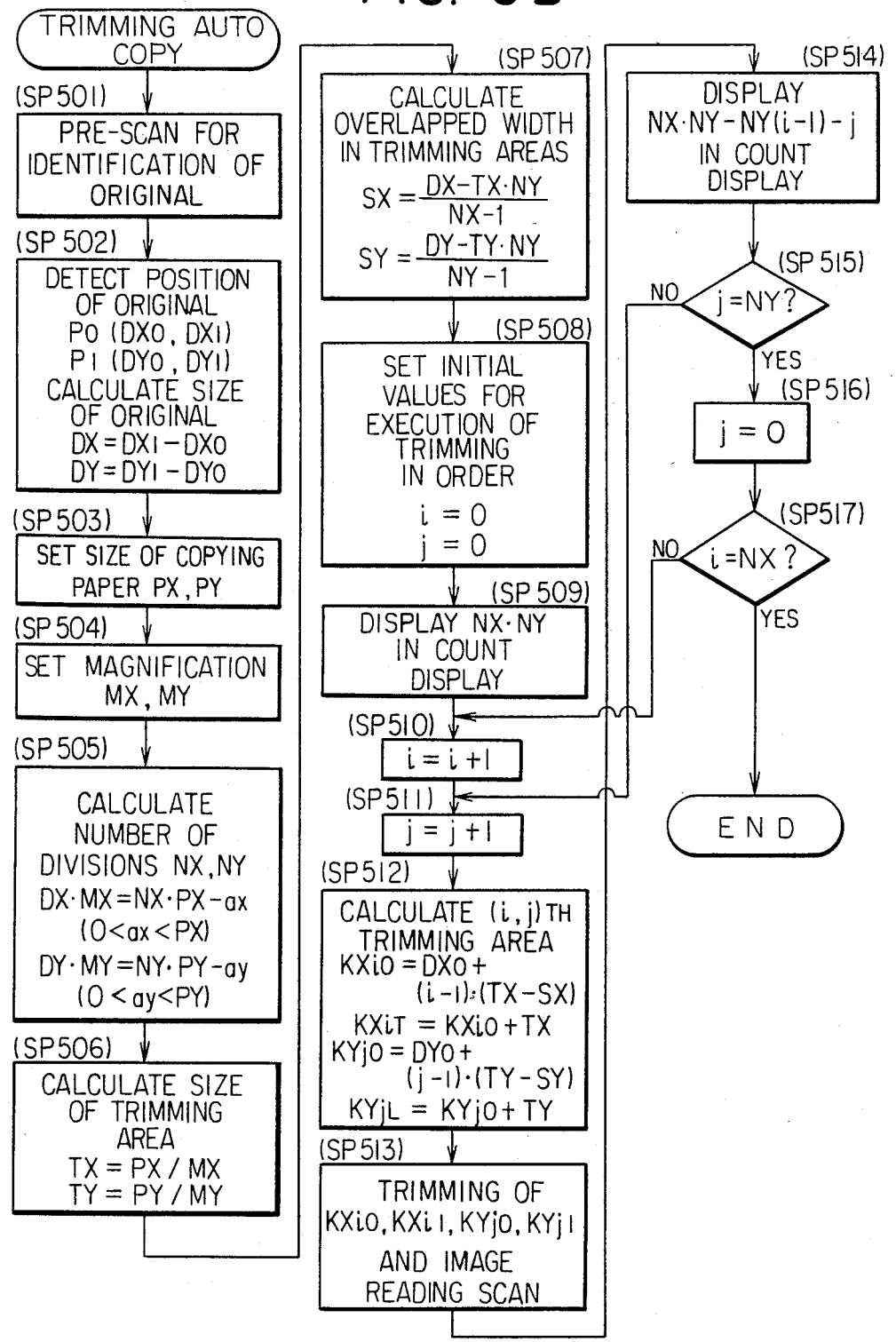

FIG. 5B shows a flow chart of edit function trimming auto-copy operation. Pre-scan to recognize the position and the size of the document sheet is carried out (SP501). The coordinate $P_0$, $P_1$ of the document sheet mounted on the glass as shown in FIG. 6A is detected by the coordinate detection logic, and it is set in the data area DX0, DX1, DY0, DY1 on the RAM, and a size DX1−DX0 of the document sheet in the X-direction (main scan direction) and a size DY1−DY0 in the Y-direction (sub-scan direction) calculated based on the coordinate are set in the data areas DX and DY on the RAM (SP502). Then, lengths of the copy sheet in the main scan direction and the sub-scan direction selected by the operator are set in the areas PX and PY on the RAM (SP503). Magnifications in the main scan direction and the sub-scan direction selected by the operator are set in the areas MX and MY on the RAM (SP504).

Then NX which satisfies DX.MX=NX.PX−ax (0<ax<PX) and NY which satisfies DY.MY=NY.-

PY−ay (0<ay<PY) are calculated and they are set in the data areas on the RAM (SP505), where ax and ay are patching areas.

From the above calculation, the number NX of copy sheets of the size selected by the operator required in the main scan direction, the number NY of copy sheets required in the sub-scan direction and total number NX.NY of copy sheets required to constitute the image of the size determined by the products of the document sheet sizes DX and DY, and the magnifications MY and MX selected by the operator, are determined. From the copy sheet sizes PX and PY and the magnifications MX and MY selected by the operator, the size of the trimming area is calculated and it is set on the areas TX and TY on the RAM (SP506). Based on the data NX and NY, the area of the size TX in the main scan direction is sequentially and repeatedly trimmed NX times to read the document image of the document size DX. To this end, SX=(DX−TX.NX)/(NX−1) is calculated, and the trimming area adjacent by SX is overlapped in the main scan direction. Similarly, SY=(DY−TY.NY)/(NY−1) is calculated in the sub-scan direction and the trimming area is overlapped by SY. The SX and SY are set in the areas on the RAM(SP507). Those NX, NY, TX, TY, SX and SY are shown in FIG. 6B.

Figure 6B:
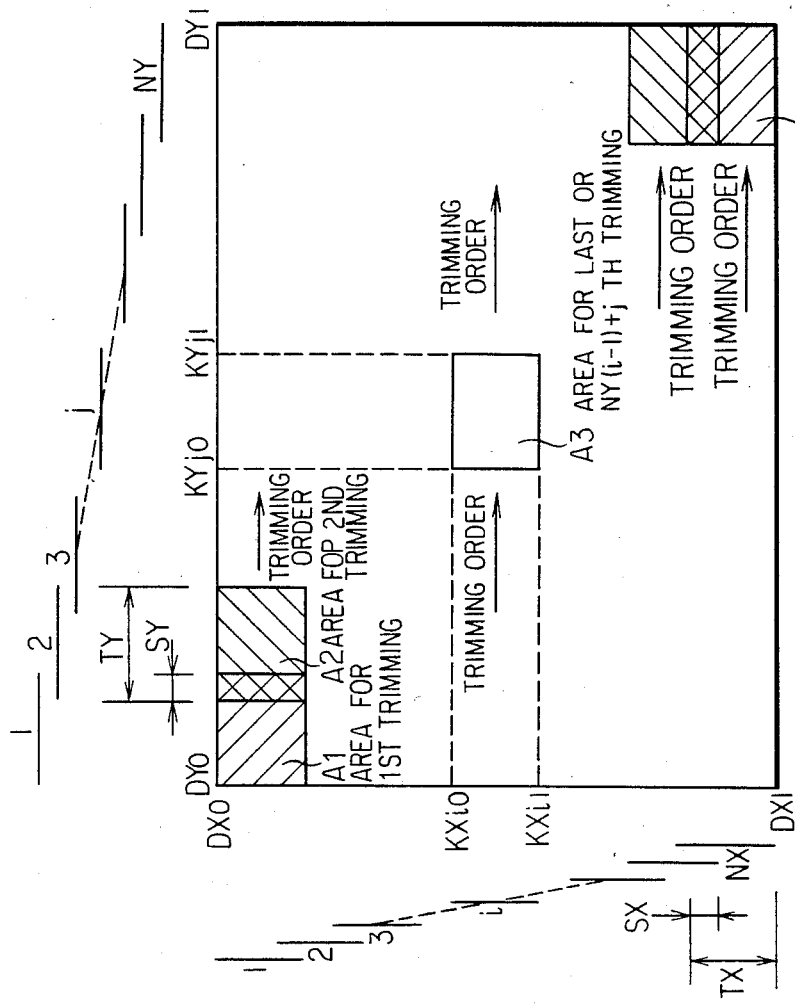

The trimming is carried out in the order shown by an arrow in FIG. 6B. Counters therefore are assumed in areas i and j on the RAM. Prior to the start of the trimming, an initial value "0" is set (SP508).

In this copy mode, the operator needs only set the document sheet size, magnification and copy sheet size. The CPU calculates the number of sheet copies required to output the desired size of image and the NX.NY is displayed on the count display before the image read scan starts (SP509). Each time the trimming is carried out, the counters i and j are incremented by one (SP510, SP511).

If the (i, j) the trimming area=j-th in the main scan direction, i-th in the sub-scan direction shown in FIG. 6B, that is, the coordinate which determines NY−(i−1)+j-th trimming area is given by KXi0, KXi1, KYj0 and KYj1, they are calculated based on KXi0=DX0+(i−1).(TX−SX), KXi1=KXi0+TX, KYj0=DY0+(j−1).(TY−SY), KYj1=KYj0+TY. Those are set in the areas on the RAM (SP512).

During the first read scan of the document image, only the necessary area is trimmed by the means described above based on the calculated trimming area coodinate to magnify the image by MX and MY and output it on the designated sheet (SP513).

Figure 15:
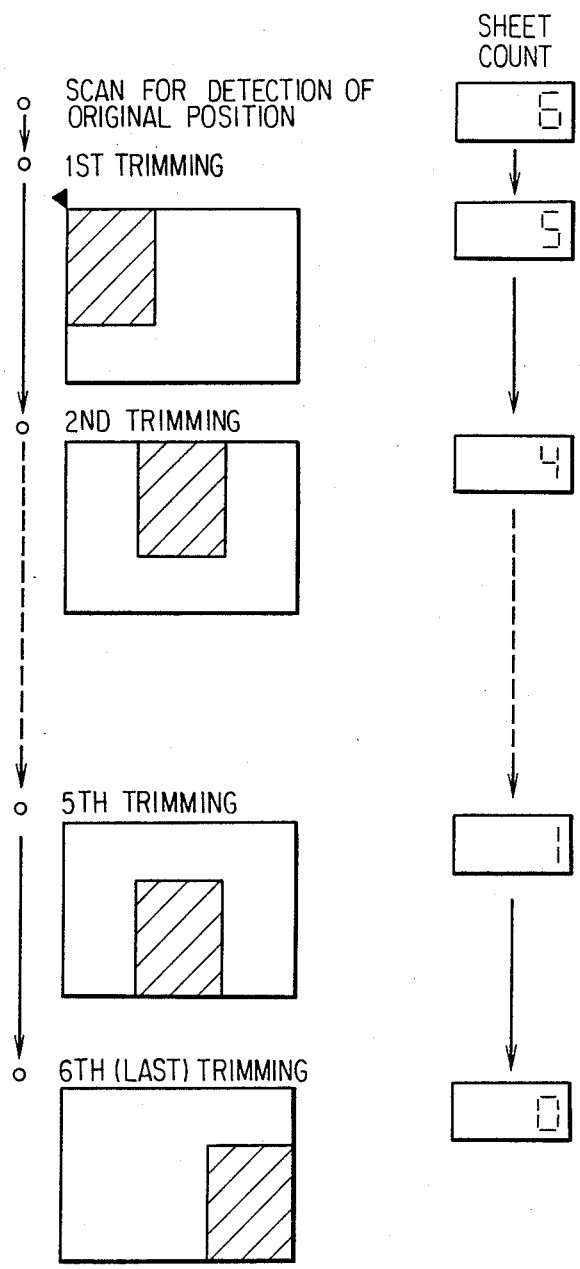
FIG. 15 shows a flow chart of a counter for the time during which when the function of the present invention is performed.

At the end of the first image read, the count is decremented by one, that is, NX.NY(i−1)−j is displayed (SP514). The change of the count display is illustrated in FIG. 15 for NY=2 and NY=3. Thus, the operator can know how many sheets are to be further outputted. Then, whether the trimming has been done NY times in the sub-scan direction or not in checked (SP515), and if NO, the trimming counter (J) in the sub-scan direction is incremented by one (SP511), and the next trimming is carried out (SP512, SP513). Thus, in response to the termination of one trimming print, the document read is resumed. If the above decision is YES, the trimming counter (j) in the sub-scan direction is cleared to "0" (SP516), and whether the trimming has been done NX times in the main scan direction or not is checked (SP517). If the decision is NO, the trimming counter (i) in the main scan direction is incremented by one (SP510) and the trimming counter (j) in the sub-scan direction which has been cleared to "0" is also incremented by one, and then the next trimming is performed (SP512, SP513). Thus, the document read is resumed. If the above decision is YES, it means that the trimming has been performed NX.NY times in total and NX.NY copies were outputted. Thus, the copying in the auto-trimming mode is terminated.

In this manner, the trimming area of the size TX and TY of the document sheet mounted on the document sheet mounted glass shown in FIG. 6A is divided into NX.NY sections with overlapping of SX and SY as shown in FIG. 6B, and they are sequentially trimmed in the direction of arrow to produce NX.NY sheets of copy. After the end of one trimming, the step SP513 may be reexecuted in response to a restart instruction by the operator so that each print output may be confirmed. By pitching the output copies by overlapping by MX.SX in the main scan direction and MY.SY in the sub-scan direction, the enlarged copy having the length DX.MY in the main scan direction and DM.MY in the sub-scan direction which cannot be attained in one copy sheet, is produced as shown in FIG. 7.

In the present embodiment, since the maximum copy sheet size is A3 and the maximum magunification is 400%, the maximum output size is 1188 mm in the main scan direction and 1680 mm in the sub-scan direction, that is, double of the size A0.

In the present embodiment, one trimming and printout thereof are performed while the document is read, and the above operation is repeated (real time type). In an alternative embodiment, the document is read and stored in a memory which can store one page of document, and the trimming is repeated for the data in the memory. This embodiment may be applied to display the memory image read from the document on the CRT and trim the displayed image.

It may also be applied to repeatedly transmit the data in the trimming area to other terminal for reproduction.

In the step SP514, the sheet is counted for each print output while its count number is printed as SX or SY of "the pitching area" in the trimming print sheet, so that the printed sheets are readily put in order.

The numbering is attained by providing a character generator in the reader, converting the code signal of the count to a pattern signal and adding the pattern signal to the VIDEO of FIG. 9 in synchronism with the output timing of SY.

In the copying machine in which the document image is directly exposed onto the photoconductor drum, the trimming may be attained by erasing the area of the latent image of the document image other than the partial area. By repeatedly designating the partial area a plurality of partial copies can be continuously produced.

I claim:

1. An image processing apparatus comprising:
   generating means for generating image data representing an original image;
   first outputting means for outputting size data representing the size of a print sheet;
   second outputting means for outputting magnification data to be used for varying the size of the original image;
   process means for determining a number of divisions of the original image in accordance with the size data and the magnification data; and
   reproducing means for reproducing an image on the print sheet on the basis of the image data, said reproducing means being operable to divide the original image into a plurality of images on the basis of the number of divisions determined by said process means and to reproduce the thus divided images, the sizes of which are varied in accordance with the magnification data, on different print sheets, respectively.

2. An image processing apparatus according to claim 1, wherein said generating means comprises scanning means for scanning the original image so as to generate the image data.

3. An image processing apparatus according to claim 1, wherein said first outputting means outputs size data representing the size of a manually selected print sheet.

4. An image processing apparatus according to claim 1, wherein said second outputting means outputs the magnification data in accordance with a manually set magnification rate.

5. An image processing apparatus according to claim 1, wherein said reproducing means is operable to reproduce the divided image serially.

6. An image processing apparatus according to claim 1, wherein said reproducing means comprises extracting means for extracting image data corresponding to each of the divided images.

7. An image processing apparatus according to claim 1, wherein said reproducing means comprises means for changing the size of the original image in accordance with the magnification data.

8. An image processing apparatus comprising:
generating means for generating image data representing an original image;
first outputting means for outputting size data representing the size of a print sheet;
second outputting means for outputting magnification data to be used for varying the size of the original image;
process means for determining the size of the area of the original image in accordance with the size data and the magnification data; and
reproducing means for reproducing an image on the print sheet on the basis of the image data, said reproducing means being operable to divide the original image into a plurality of images of a size determined by said process means, and to reproduce the thus divided images on different print sheets, respectively.

9. An image processing apparatus according to claim 8, wherein said generating means comprises scanning means for scanning the original image so as to generate the image data.

10. An image processing apparatus according to claim 8, wherein said first outputting means outputs size data representing the size of a manually selected print sheet.

11. An image processing apparatus according to claim 8, wherein said second outputting means outputs the magnification data in accordance with a manually set magnification rate.

12. An image processing apparatus according to claim 8, wherein said reproducing means is operable to reproduce the divided image serially.

13. An image processing apparatus according to claim 8, wherein said reproducing means comprises extracting means for extracting image data corresponding to each of the divided images.

14. An image processing apparatus according to claim 8, wherein said reproducing means comprises means for changing the size of the original image in accordance with the magnification data.

15. An image processing apparatus according to claim 8, wherein said process means determines the number of divisions of the original image.

16. An image processing apparatus comprising:
generating means for generating image data representing an original image;
first outputting means for outputting size data representing the size of a print sheet;
second outputting means for outputting magnification data to be used for varying the size of the original image;
process means for determining a number of print sheets in accordance with the size data and the magnification data; and
reproducing means for reproducing an image on the print sheet on the basis of the image data, wherein said reproducing means is operable to divide the original image into a plurality of images on the basis of the number of print sheets determined by said process means and to reproduce the thus divided images, the sizes of which are varied in accordance with the magnification data, on different print sheets, respectively.

17. An image processing apparatus according to claim 16, wherein said generating means comprises scanning means for scanning the original image so as to generate the image data.

18. An image processing apparatus according to claim 16, wherein said first outputting means outputs size data representing the size of a manually selected print sheet.

19. An image processing apparatus according to claim 16, wherein said second outputting means outputs the magnification data in accordance with a manually set magnification rate.

20. An image processing apparatus according to claim 16, wherein said reproducing means is operable to reproduce the divided image serially.

21. An image processing apparatus according to claim 16, wherein said reproducing means comprises extracting means for extracting image data corresponding to each of the divided images.

22. An image processing apparatus according to claim 16, wherein said reproducing means comprises means for changing the size of the original image in accordance with the magnification data.

23. An image processing apparatus comprising:
generating means for generating image data representing an original image;
first outputting means for outputting size data representing the size of the original image;
second outputting means for outputting magnification data for varying the size of the original image;
process means for determining a number of divisions of the original image in accordance with the size data and the magnification data; and
reproducing means for reproducing an image on a print sheet on the basis of the image data, said reproducing means being operable to divide the original image into a plurality of images on the basis of the number of divisions determined by said process means and to reproduce the thus divided images, the sizes of which are varied in accordance with the magnification data, on different print sheets, respectively.

24. An image processing apparatus according to claim 23, wherein said generating means comprises scanning means for scanning the original image so as to generate the image data.

25. An image processing apparatus according to claim 23, wherein said first outputting means comprises detecting means for detecting the size of the original image so as to output the size data.

26. An image processing apparatus according to claim 23, wherein said second outputting means outputs the magnification data in accordance with a manually set magnification rate.

27. An image processing apparatus according to claim 23, wherein said reproducing means is operable to reproduce the divided image serially.

28. An image processing apparatus according to claim 23, wherein said reproducing means comprises extracting means for extracting image data corresponding to each of the divided images.

29. An image processing apparatus according to claim 23, wherein said reproducing means comprises means for changing the size of the original image in accordance with the magnification data.

30. An image processing apparatus comprising:
generating means for generating image data representing an original image;
first outputting means for outputting size data representing the size of the original image;
second outputting means for outputting magnification data for varying the size of the original image;
process means for determining a number of print sheets in accordance with the size data and the magnification data; and
reproducing means for reproducing an image on a print sheet on the basis of the image data, said reproducing means being operable to divide the original image into a plurality of images on the basis of the number of print sheets determined by said process means and to reproduce the divided images, the sizes of which are varied in accordance with the magnification data, on different print sheets, respectively.

31. An image processing apparatus according to claim 30, wherein said generating means comprises scanning means for scanning the original image so as to generate the image data.

32. An image processing apparatus according to claim 30, wherein said first outputting means comprises detecting means for detecting the size of the original image so as to output the size data.

33. An image processing apparatus according to claim 30, wherein said second outputting means outputs the magnification data in accordance with a manually set magnification rate.

34. An image processing apparatus according to claim 30, wherein said reproducing means is operable to reproduce the divided image serially.

35. An image processing apparatus according to claim 30, wherein said reproducing means comprises extracting means for extracting image data corresponding to each of the divided images.

36. An image processing apparatus according to claim 30, wherein said reproducing means comprises means for changing the size of the original image in accordance with the magnification data.

37. An image processing apparatus comprising:
generating means for generating image data representing an original image;
first outputting means for outputting sheet size data representing the size of a print sheet;
second outputting means for outputting original size data representing the size of the original image;
process means for determining a number of divisions of the original image in accordance with the sheet size data and the original size data; and
reproducing means for reproducing an image on the print sheet on the basis of the image data, said reproducing means being operable to divide the original image into a plurality of images on the basis of the number of divisions determined by said process means and to reproduce the thus divided images on different print sheets, respectively.

38. An image processing apparatus according to claim 37, wherein said generating means comprises scanning means for scanning the original image so as to generate the image data.

39. An image processing apparatus according to claim 37, wherein said first outputting means outputs the sheet size data representing the size of a manually selected print sheet.

40. An image processing apparatus according to claim 37, wherein said second outputting means comprises detecting means for detecting the size of the original image so as to output the original size data.

41. An image processing apparatus according to claim 37, wherein said reproducing means is operable to reproduce the divided image serially.

42. An image processing apparatus according to claim 37, wherein said reproducing means comprises extracting means for extracting image data corresponding to each of the divided images.

43. An image processing apparatus according to claim 37, wherein said reproducing means comprises means for changing the size of the original image in accordance with the magnification data.

44. An image processing apparatus comprising:
generating means for generating image data representing an original image;
first outputting means for outputting sheet size data representing the size of a print sheet;
second outputting means for outputting original size data representing the size of the original image;
process means for determining a number of print sheets in accordance with the sheet size data and the original size data; and
reproducing means for reproducing an image on the print sheet on the basis of the image data, said reproducing means being operable to divide the original image into a plurality of images on the basis of the number of print sheets determined by said process means and to reproduce the divided images on different print sheets, respectively.

45. An image processing apparatus according to claim 44, wherein said generating means comprises scanning means for scanning the original image so as to generate the image data.

46. An image processing apparatus according to claim 44, wherein said first outputting means outputs the sheet size data representing the size of a manually selected print sheet.

47. An image processing apparatus according to claim 44, wherein said second outputting means comprises detecting means for detecting the size of the original image so as to output the original size data.

48. An image processing apparatus according to claim 44, wherein said reproducing means is operable to reproduce the divided image serially.

49. An image processing apparatus according to claim 44, wherein said reproducing means comprises extracting means for extracting image data corresponding to each of the divided images.

50. An image processing apparatus according to claim 44, wherein said reproducing means comprises means for changing the size of the original image in accordance with the magnification data.

51. An image processing apparatus comprising:
generating means for generating image data representing an original image;
dividing means for dividing the original image into a plurality of images in accordance with the size of the print sheet and a magnification rate for varying the size of the original image; and
reproducing means for reproducing an image on a print sheet on the basis of the image data, said reproducing means being operable to reproduce the divided images on different mutually overlapping print sheets, respectively.

52. An image processing apparatus according to claim 51, wherein said generating means comprises scanning means for scanning the original image so as to generate the image data.

53. An image processing apparatus according to claim 51, wherein said reproducing means is operable to reproduce the divided image serially.

54. An image processing apparatus according to claim 51, wherein said reproducing means comprises extracting means for extracting image data corresponding to each of the divided images.

55. An image processing apparatus according to claim 51, wherein said reproducing means is operable to reproduce the divided images, the sizes of which are varied.

56. An image processing apparatus comprising:
generating means for generating image data representing an original image;
dividing means for dividing the original image into a plurality of images in accordance with the size of the print sheet and a magnification rate for varying the size of the original image; and
reproducing means for reproducing an image on a print sheet on the basis of the image data, said reproducing means being operable to reproduce the divided images on different prints sheets so that a reproduced original image is in the center of an image frame constituted by the different print sheets.

57. An image processing apparatus according to claim 56, wherein said generating means comprises scanning means for scanning the original image so as to generate the image data.

58. An image processing apparatus according to claim 56, wherein said reproducing means is operable to reproduce the divided image serially.

59. An image processing apparatus according to claim 56, wherein said reproducing means comprises extracting means for extracting image data corresponding to each of the divided images.

60. An image processing apparatus according to claim 56, wherein said reproducing means is operable to reproduce the divided images, the sizes of which are varied.

61. An image processing apparatus comprising:
generating means for generating image data representing an original image;
dividing means for dividing the original image data into a plurality of images;
reproducing means for reproducing an image on a print sheet on the basis of the image data, said reproducing means being operable to serially reproduce the divided images on different print sheets, respectively; and
displaying means for displaying a state of progress of image reproduction by said reproducing means.

62. An image processing apparatus according to claim 61, wherein said generating means comprises scanning means for scanning the original image so as to generate the image data.

63. An image processing apparatus according to claim 61, wherein said dividing means is operable to divide the original image in accordance with the size of the print sheet and a magnification rate for varying the size of the original image.

64. An image processing apparatus according to claim 61, wherein said displaying means is operable to display the state of progress of image reproduction by employing numerals.

65. An image processing apparatus according to claim 61, wherein said reproducing means comprises extracting means for extracting image data corresponding to each of the divided images.

66. An image processing apparatus according to claim 61, wherein said reproducing means is operable to reproduce the divided images, the sizes of which are varied.

* * * * *

UNITED STATES PATENT AND TRADEMARK OFFICE
CERTIFICATE OF CORRECTION

PATENT NO. : 4,905,095
DATED : February 27, 1990
INVENTOR(S) : MASANORI YAMADA

It is certified that error appears in the above-identified patent and that said Letters Patent is hereby corrected as shown below:

On the title page:

IN [56] REFERENCES CITED

U.S. PATENT DOCUMENTS, "4,686,590 8/1987" should read --4,686,580 8/1987--.

COLUMN 2

Line 5, "when" should be deleted.
Line 16, "face-down, state" should read --face-down state,--.

COLUMN 4

Line 48, "latch 311 The" should read --latch 311. The--.

COLUMN 7

Line 40, "during with" should read --during which--.

COLUMN 8

Line 30, "In" should read --If--.
Line 40, "shown ③" should read --shown in ③,--.

COLUMN 9

Line 49, "coodinate" should read --coordinate--.

UNITED STATES PATENT AND TRADEMARK OFFICE
CERTIFICATE OF CORRECTION

PATENT NO. : 4,905,095
DATED : February 27, 1990
INVENTOR(S) : MASANORI YAMADA

It is certified that error appears in the above-identified patent and that said Letters Patent is hereby corrected as shown below:

COLUMN 10

Line 24, "magunification" should read --magnification--.

COLUMN 15

Line 50, "prints" should read --print--.

Signed and Sealed this

Third Day of March, 1992

*Attest:*

HARRY F. MANBECK, JR.

*Attesting Officer*   *Commissioner of Patents and Trademarks*